US010553237B2

United States Patent
Nakano

(10) Patent No.: US 10,553,237 B2
(45) Date of Patent: Feb. 4, 2020

(54) RADIO COMMUNICATION DEVICE

(71) Applicant: JVC KENWOOD Corporation, Yokohama-shi, Kanagawa (JP)

(72) Inventor: Manabu Nakano, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 170 days.

(21) Appl. No.: 15/890,395

(22) Filed: Feb. 7, 2018

(65) Prior Publication Data
US 2018/0254055 A1 Sep. 6, 2018

(30) Foreign Application Priority Data

Mar. 6, 2017 (JP) .................................. 2017-041594
Mar. 6, 2017 (JP) .................................. 2017-041597

(51) Int. Cl.
*G10L 25/27* (2013.01)
*H04B 1/04* (2006.01)
*H04L 1/00* (2006.01)
*G10L 25/72* (2013.01)
*H04W 4/02* (2018.01)
*H04W 4/10* (2009.01)

(52) U.S. Cl.
CPC ............... *G10L 25/27* (2013.01); *G10L 25/72* (2013.01); *H04B 1/04* (2013.01); *H04L 1/00* (2013.01); *H04W 4/023* (2013.01); *H04W 4/10* (2013.01)

(58) Field of Classification Search
CPC ............ H04L 1/00; G10L 25/72; G10L 25/27
See application file for complete search history.

(56) References Cited

U.S. PATENT DOCUMENTS

| 2013/0173266 | A1* | 7/2013 | Nishino | G10L 17/00 704/236 |
| 2014/0002574 | A1* | 1/2014 | Jeong | H04N 7/14 348/14.01 |
| 2017/0193797 | A1* | 7/2017 | Gschwind | H04W 4/02 |
| 2018/0254055 | A1* | 9/2018 | Nakano | G10L 25/84 |
| 2018/0336002 | A1* | 11/2018 | Hansen | H05B 37/0236 |

FOREIGN PATENT DOCUMENTS

JP 2010-226274 A 10/2010

* cited by examiner

*Primary Examiner* — Samuel G Neway
(74) *Attorney, Agent, or Firm* — Nath, Goldberg & Meyer; Jerald L. Meyer

(57) ABSTRACT

A transmission controller monitors a sound pressure determination signal and a distance determination signal. The transmission controller controls a transmission voice processor to start an operation of generating a transmission voice signal, when the distance determination signal indicates that a distance is equal to or less than a first distance. The transmission controller controls to start an operation of determining a sound pressure of a voice signal, when the distance determination signal indicates that the distance is equal to or less than a second distance shorter than the first distance. The transmission controller supplies a transmission control signal to a transmission circuit so that the transmission circuit transmits the transmission voice signal as a radio wave, when the sound pressure determination signal indicates that the sound pressure is equal to or greater than a predetermined threshold value.

9 Claims, 11 Drawing Sheets

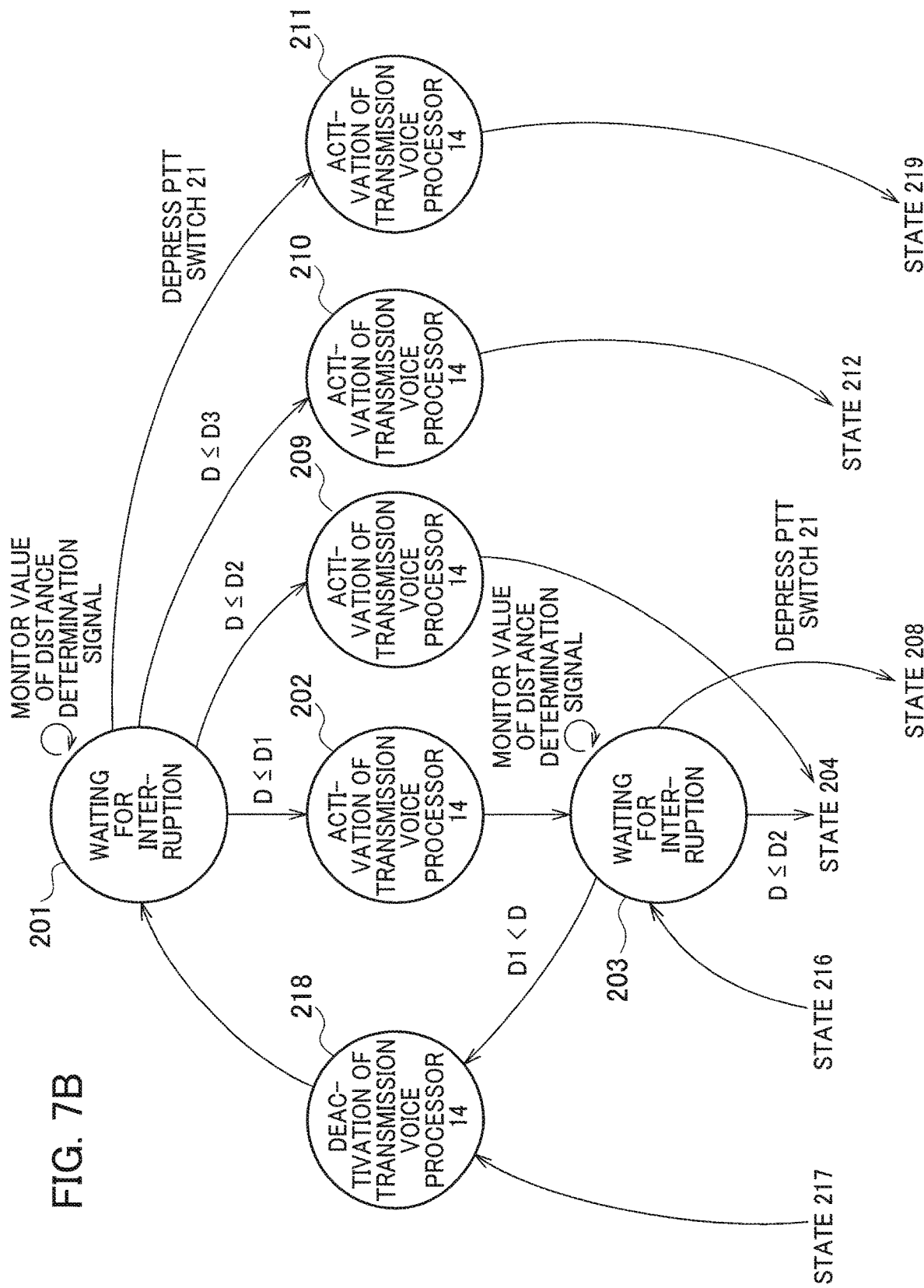

RADIO COMMUNICATION DEVICE

CROSS REFERENCE TO RELATED APPLICATION

This application is based upon and claims the benefit of priority under 35U.S.C.§ 119 from Japanese Patent Application No. 2017-041594, filed on Mar. 6, 2017, and Japanese Patent Application No. 2017-041597, filed on Mar. 6, 2017, the entire contents of both of which are incorporated herein by reference.

BACKGROUND

The present disclosure relates to a radio communication device.

Japanese Unexamined Patent Application Publication No. 2010-226274 (Patent Document 1) describes a radio communication device configured to detect that a user of the radio communication device is present in a vicinity of the radio communication device by a human sensor, and to switch the radio communication device to a transmission state. The human sensor detects the presence of the user by sensing heat emitted from a human body.

SUMMARY

In the radio communication device described in Patent Document 1, the radio communication device is switched to the transmission state merely by detecting that the user is present in the vicinity of the radio communication device by means of a human sensor. It may happen that the radio communication device is switched to the transmission state even though the user is not about to transmit voice.

A first aspect of the embodiments provides a radio communication device including: a sound pressure determination unit configured to determine a sound pressure of a voice signal output from a microphone, and to generate a sound pressure determination signal; a distance determination unit configured to determine a distance from the radio communication device to a user of the radio communication device based on a detection value that is generated by a distance sensor and corresponds to the distance from the radio communication device to the user, and to generate a distance determination signal; a transmission voice processor configured to implement voice processing for the voice signal output from the microphone, and to generate a transmission voice signal; a transmission circuit configured to transmit the transmission voice signal as a radio wave; and a transmission controller configured to monitor the sound pressure determination signal and the distance determination signal, wherein the transmission controller: controls the transmission voice processor to start operations of implementing the voice processing for the voice signal output from the microphone and for generating the transmission voice signal, when the distance determination signal indicates that the distance is equal to or less than a first distance; controls the sound pressure determination unit to start an operation of determining the sound pressure of the voice signal output from the microphone, when the distance determination signal indicates that the distance is equal to or less than a second distance shorter than the first distance; and supplies a transmission control signal to the transmission circuit so that the transmission circuit transmits the transmission voice signal as a radio wave, when the sound pressure determination signal indicates that the sound pressure is equal to or greater than a predetermined threshold value.

A second aspect of the embodiments provides a radio communication device including: a sound pressure determination unit configured to determine a sound pressure of a voice signal output from a microphone, and to generate a sound pressure determination signal; a distance determination unit configured to determine a distance from the radio communication device to a user of the radio communication device based on a detection value that is generated by a distance sensor and corresponds to the distance from the radio communication device to the user, and to generate a distance determination signal; a recording unit configured to update and record the voice signal output from the microphone for a predetermined time; a transmission voice processor configured to implement voice processing for the voice signal output from the microphone subsequently to a voice signal read from the recording unit, and to generate a transmission voice signal; a transmission circuit configured to transmit the transmission voice signal as a radio wave; and a transmission controller configured to monitor the sound pressure determination signal and the distance determination signal, wherein the transmission controller: controls the transmission voice processor to start to operate when the distance determination signal indicates that the distance is equal to or less than a first distance; controls the recording unit to start operations of update recording and reading the voice signal, when the distance determination signal indicates that the distance is equal to or less than a second distance shorter than the first distance; controls the sound pressure determination unit to start an operation of determining the sound pressure of the voice signal output from the microphone, when the distance determination signal indicates that the distance is equal to or less than a third distance shorter than the second distance, and supplies a transmission control signal to the transmission circuit so that the transmission circuit transmits, as a radio wave, a transmission voice signal, generated by the transmission voice processor, including the voice signal read from the recording unit and the voice signal output from, the microphone, when the sound pressure determination signal indicates that the sound pressure is equal to or greater than a predetermined threshold value.

BRIEF DESCRIPTION OF THE DRAWINGS

FIG. 7B is a partial state transition diagram illustrating the operations of the radio communication device according to the second embodiment.

DETAILED DESCRIPTION

First Embodiment

Figure 1:
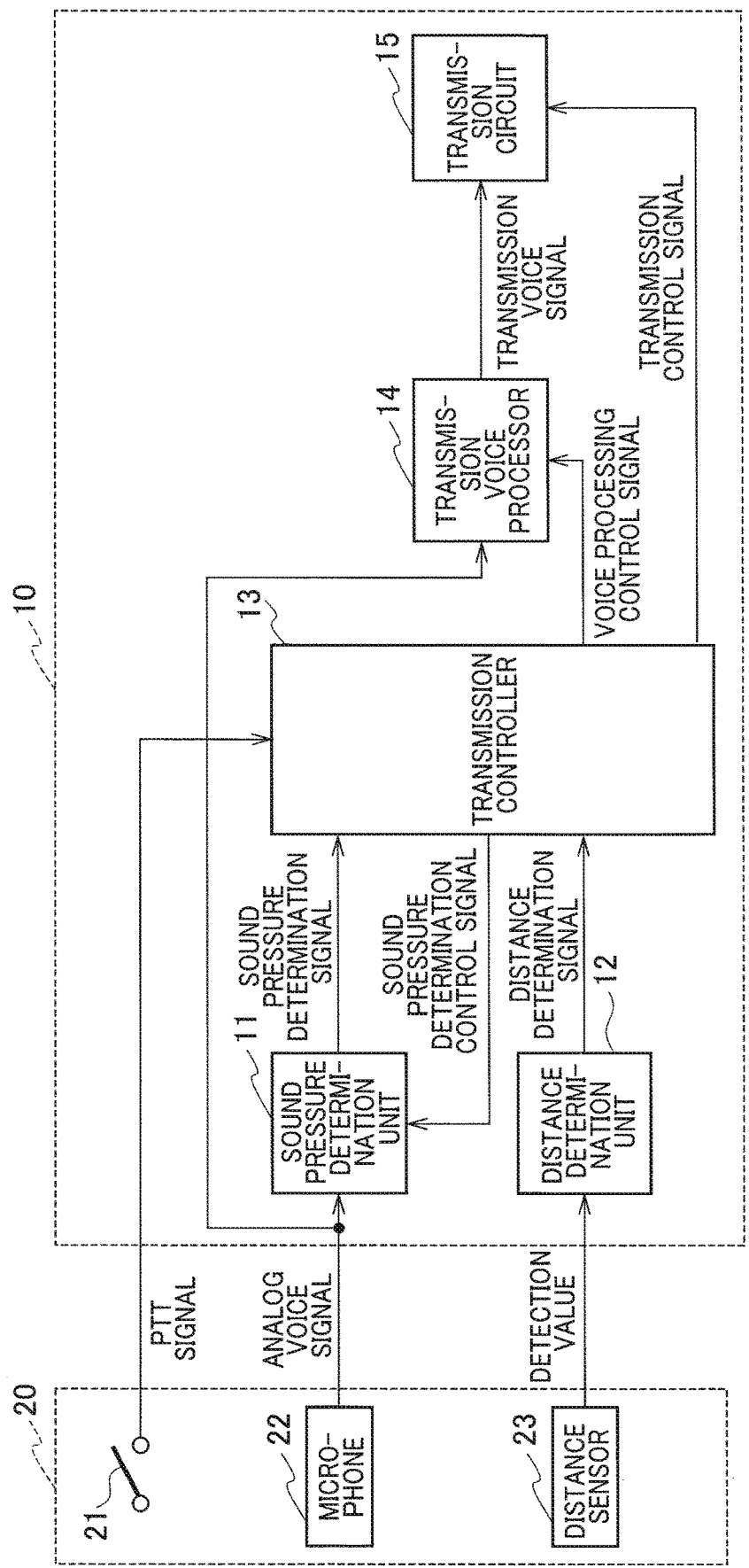
FIG. 1 is a block diagram illustrating a radio communication device according to a first embodiment.

Hereinafter, a description will be made of a radio communication device according to a first embodiment with reference to the accompanying drawings. In. FIG. 1, the radio communication device according to the first embodiment includes a main body 10 and a speaker microphone 20 connected to the main body 10. Functions of the speaker microphone 20 may be incorporated in the main body 10. The radio communication device transmits or receives voice data in a half-duplex communication method.

Figure 2A:
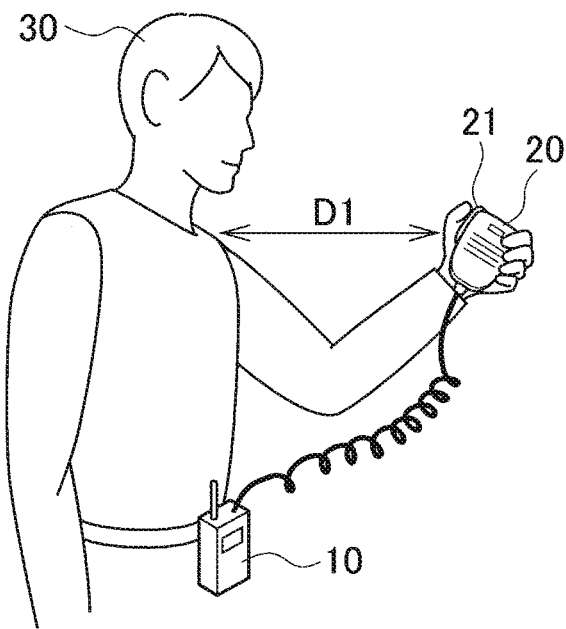
FIG. 2A is a diagram illustrating a state in which a user tries to use a speaker microphone and brings the speaker microphone close to himself/herself.
Figure 2B:
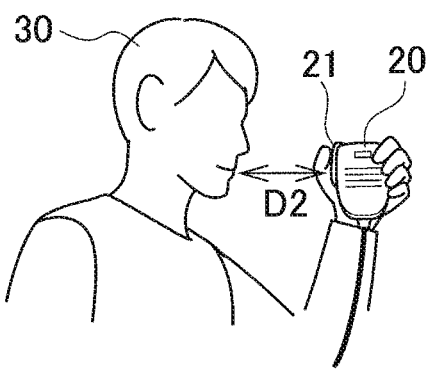
FIG. 2B is a diagram illustrating a state in which the user brings the speaker microphone closer to himself/herself than in FIG. 2A in order to emit a voice.

As shown in FIG. 2A or FIG. 2B, a user 30 of the radio communication device mounts the main body 10 at any position on his or her body, and grasps the speaker microphone 20 by hand when trying to transmit voice data. When the functions of the speaker microphone 20 are incorporated in the main body 10, the user 30 grips the main body 10 by hand.

In FIG. 1, the speaker microphone 20 includes a PTT (Push To Talk) switch 21, a microphone 22, and a distance sensor 23. The speaker microphone 20 includes a speaker (not shown) that generates a voice which is based on voice data received by the main body 10. The main body 10 includes a sound pressure determination unit 11, a distance determination unit 12, a transmission controller 13, a transmission voice processor 14, and a transmission circuit 15. The main body 10 also includes a reception circuit (not shown), but only components related to transmission are shown in FIG. 1.

When the user 30 depresses the PTT switch 21 for transmitting voice data, the PTT switch 21 supplies a PTT signal for operating the transmission circuit 15 to the transmission controller 13. When the user 30 emits a voice, the microphone 22 collects the voice, and supplies an analog voice signal to the sound pressure determination unit 11 and the transmission voice processor 14.

For example, the distance sensor 23 emits a transmission wave which is made of infrared rays to a predetermined object, and supplies a detection value generated based on a phase difference between the transmission wave and a reflected wave which is reflected by the object to the distance determination unit 12. The detection value of the distance sensor 23 is a value corresponding to a distance from the distance sensor 23 to the object. Here, the object is the user 30.

The sound pressure determination unit 11 is provided to realize a so-called VOX (Voice-Operated Transmit) function to switch the radio communication device to a transmission state when the microphone 22 collects the voice. The radio communication device provided with the VOX function is capable of hands-free talk. The sound pressure determination unit 11 determines a sound pressure of the analog voice signal input thereto, and generates a sound pressure determination signal.

The sound pressure determination unit 11 generates a signal indicating "sound presence" if the sound pressure is equal to or greater than a predetermined threshold value, and generates a sound pressure determination signal indicating "silence" if the sound pressure is less than the predetermined threshold value. Furthermore, a voice during a conversation is not a continuous sound. Therefore, when the sound pressure reaches the predetermined threshold value or greater, and thereafter, the sound pressure becomes less than the predetermined threshold value, and the sound pressure determination unit 11 maintains a sound pressure determination signal, which indicates the sound presence, for a predetermined time. The sound pressure determination unit 11 supplies the sound pressure determination signal to the transmission controller 13.

As will be described later, the sound pressure determination unit 11 is not always operating, and is configured to operate when conditions to be described later are satisfied.

The distance determination unit 12 determines the distance to the user 30 based on the detection value input thereto, and generates a distance determination signal. The distance determination unit 12 supplies the distance determination signal to the transmission controller 13. Based on the input distance determination signal, the transmission controller 13 can determine whether the distance D from the distance sensor 23 (the speaker microphone 20) to the user 30 is equal to or less than the distance D1 shown in FIG. 2A, or is equal to or less than the distance D2 shown in FIG. 2B.

The distance D1 shown in FIG. 2A is a distance in a state in which the user 30 tries to use the speaker microphone 20, and brings the speaker microphone 20 close to himself/herself. The distance D2 shown in FIG. 2B is a distance in a state in which the user 30 brings the speaker microphone 20 closer to himself/herself in order to emit a voice.

The transmission controller 13 controls the sound pressure determination unit 11, the transmission voice processor 14, and the transmission circuit 15. The transmission controller 13 can be composed of a central processing unit (CPU) of a microcomputer. The transmission controller 13 and the transmission voice processor 14 may be composed of a microcomputer, or may be composed of a DSP (Digital Signal Processor).

To the sound pressure determination unit 11, the transmission controller 13 supplies a sound pressure determination control signal for switching the sound pressure determination unit 11 between an operation and a non-operation. The transmission voice processor 14 includes: an amplifier that amplifies the analog voice signal; an A/D converter that converts the analog voice signal into a digital voice signal; a filter that filters the digital voice signal; a vocoder that encodes the filtered digital voice signal; and the like. In order to transmit the input analog voice signal by the transmission circuit 15, the transmission voice processor 14 implements voice processing for the analog voice signal, and generates a transmission voice signal.

The transmission voice processor 14 does not always operate, and is configured to operate when conditions to be described later are satisfied. To the transmission voice processor 14, the transmission controller 13 supplies a voice processing control signal for switching the transmission voice processor 14 between an operation and a non-operation. When the transmission voice processor 14 is in operation, the transmission voice processor 14 supplies the transmission voice signal to the transmission circuit 15.

The transmission circuit 15 includes a PLL (Phase-Locked Loop) circuit for oscillating at a predetermined oscillation frequency, a power amplifier, and the like. When a transmission control signal is supplied from the transmission controller 13, the transmission circuit 15 modulates the input transmission voice signal by an oscillation frequency at which the PLL circuit oscillates, and then transmits the modulated transmission voice signal as a radio wave.

Figure 3:
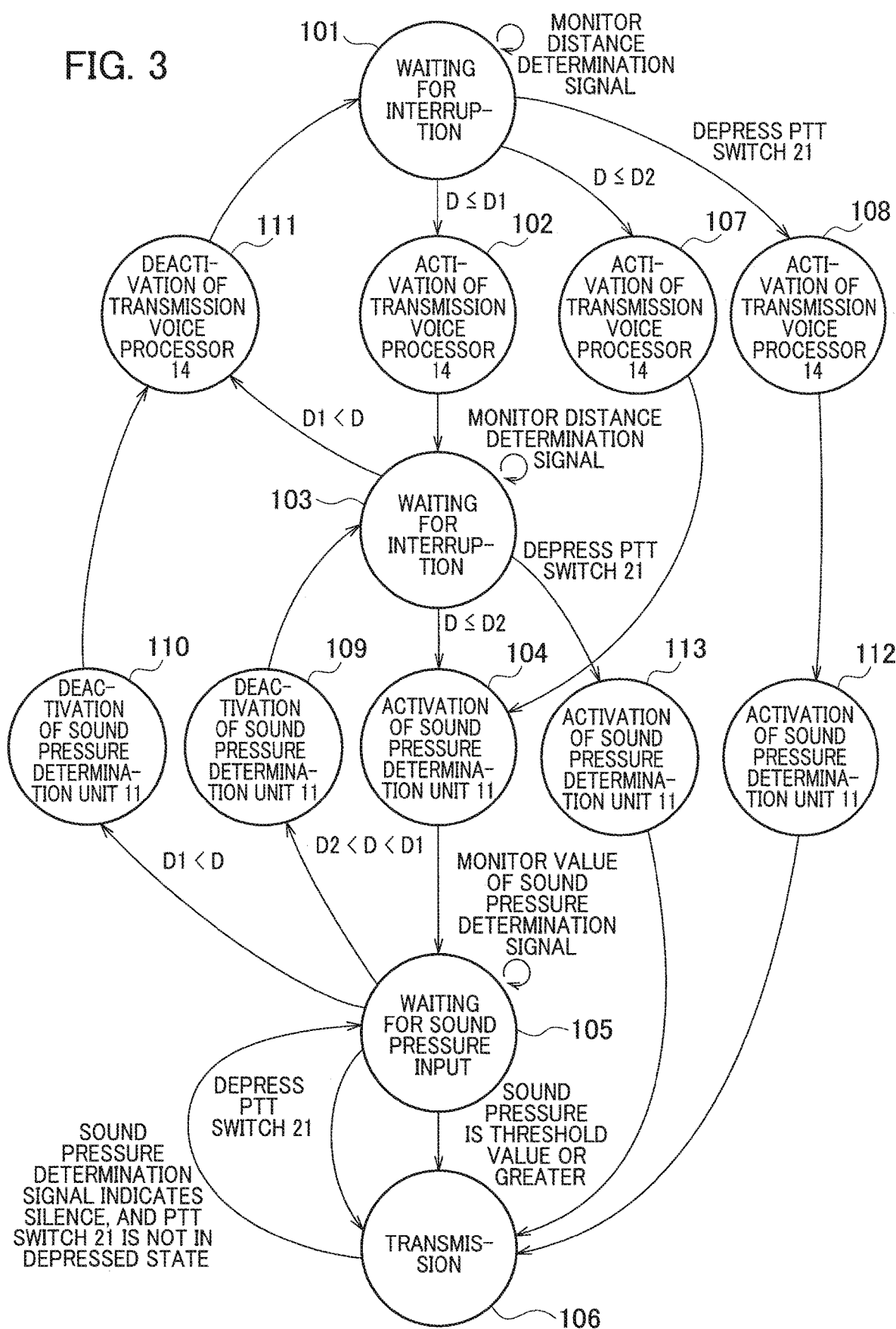
FIG. 3 is a state transition diagram illustrating operations of the radio communication device according to the first embodiment.

Next, with reference to a state transition diagram shown in FIG. 3, a description will be made of how the transmission controller 13 controls the respective units. In FIG. 3, the transmission controller 13 waits for an interruption of the distance determination signal so as to monitor the value of the distance determination signal in state 101, which is a standby state in which reception or transmission is not performed. In state 101, it is assumed that the position of the speaker microphone 20 is farther than the position of the distance D1 shown in FIG. 2A.

When the user 30 brings the speaker microphone 20 close to himself/herself, the distance D becomes equal to or less than the distance D1, and such a distance determination signal indicating that the distance D is equal to or less than the distance D1 interrupts the transmission controller 13, then the transmission controller 13 makes a transition to state 102. In state 102, the transmission controller 13 actuates the transmission voice processor 14 in non-operation, activates the transmission voice processor 14, and makes a transition to state 103.

In state 103, the transmission controller 13 further waits for an interruption of the distance determination signal. When the user 30 brings the speaker microphone 20 still closer to himself/herself, the distance D becomes equal to or less than the distance D2, and such a distance determination signal indicating that the distance D is equal to or less than the distance D2 interrupts the transmission controller 13, then the transmission controller 13 makes a transition to state 104.

In state 104, the transmission controller 13 actuates the sound pressure determination unit 11 in non-operation, activates the sound pressure determination unit 11, and makes a transition to state 105. In state 105, the transmission controller 13 waits for input of the sound pressure determination signal so as to monitor the value of the sound pressure determination signal.

When such a sound pressure determination signal indicating that the sound pressure becomes equal to or greater than the threshold value is input to the transmission controller 13, then in state 106, the transmission controller 13 supplies the transmission control signal to the transmission circuit 15, actuates the transmission circuit 15, and controls the transmission circuit 15 to transmit the transmission control signal output from the transmission controller 13.

In state 101, when the user 30 rapidly brings the speaker microphone 20 close to himself/herself, the distance D instantaneously becomes equal to or less than the distance D2. In state 101, when such a distance determination signal indicating that the distance D has become equal to or less than the distance D2 interrupts the transmission controller 13, the transmission controller 13 makes a transition to state 107. In state 107, the transmission controller 13 actuates the transmission voice processor 14 in non-operation, activates the transmission voice processor 14, and makes a transition to state 104.

Moreover, in state 101, when the user 30 depresses the PTT switch 21, then in response to the input of the PTT signal, the transmission controller 13 activates the transmission voice processor 14 in state 108, activates the sound pressure determination unit 11 in state 112, and makes a transition to state 106. In state 106, the transmission controller 13 supplies the transmission control signal to the transmission circuit 15, actuates the transmission circuit 15, and controls the transmission circuit 15 to transmit the transmission control signal output from, the transmission controller 13.

In state 103, when the user 30 depresses the PIT switch 21, then in response to the input of the PTT signal, the transmission controller 13 activates the sound pressure determination unit 11 in state 113, and makes a transition to state 106. In state 106, the transmission controller 13 actuates the transmission circuit 15, and controls the transmission circuit 15 to transmit the transmission control signal output from the transmission controller 13.

In state 105, when the user 30 depresses the PTT switch 21, the transmission controller 13 makes a transition to state 106, actuates the transmission circuit 15, and controls the transmission circuit 15 to transmit the transmission control signal output from, the transmission controller 13.

In state 106, when the sound pressure determination signal indicates the silence, and the PTT switch 21 is not in a depressed state, then the transmission controller 13 makes a transition to state 105.

In state 105, if the distance D exceeds the distance D2 and becomes less than the distance D1 before the sound pressure becomes equal to or greater than the threshold value or before the PIT switch 21 is depressed, then the transmission controller 13 makes a transition to state 109, deactivates the transmission voice processor 14, and makes a transition to state 103.

In state 105, if the distance D exceeds the distance D1 before the sound pressure becomes equal to or greater than the threshold value or before the PIT switch 21 is depressed, then the transmission controller 13 makes a transition to state 111, deactivates the transmission voice processor 14, and makes a transition to state 101.

Moreover, in state 103, if the distance D exceeds the distance D1 before the distance D becomes equal to or less than the distance D2, then the transmission controller 13 makes a transition to state 111, deactivates the transmission voice processor 14, and makes a transition to state 101.

Figure 4:
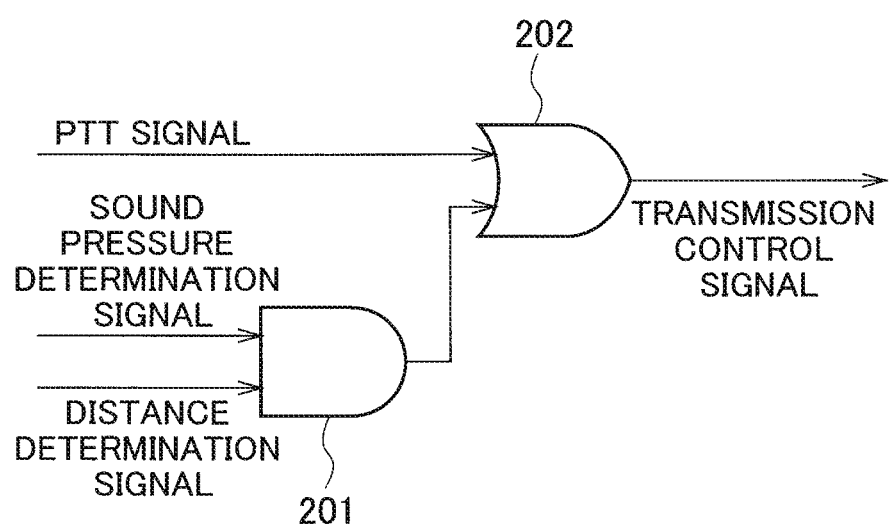
FIG. 4 is a conceptual diagram logically illustrating conditions under which a transmission controller in the radio communication device according to the first embodiment operates a transmission circuit.

FIG. 4 is a logical conceptual diagram showing conditions under which the transmission controller 13 supplies the transmission control signal to the transmission circuit 15 to operate the transmission circuit 15. The sound pressure determination signal and the distance determination signal are input to an AND circuit 201. A high output signal is input to an OR circuit 202 under conditions that the sound pressure determination signal indicates sound presence and that the distance D is equal to or less than the distance D2, the conditions being determined by the sound pressure determination signal and the distance determination signal.

The PTT signal and the output signal of the AND circuit 201 are input to the OR circuit 202. The OR circuit 202 supplies the transmission control signal to the transmission circuit 15, when the PTT signal is input to the OR circuit 202, or the high output signal is input thereto.

As described above, in the radio communication device according to the first embodiment, when the distance determination signal indicates that the distance is equal to or less than such a first distance, the transmission controller causes the transmission voice processor 14 to start operations of implementing the voice processing for the voice signal output from the microphone 22 and for generating the transmission voice signal.

In the radio communication device according to the first embodiment, when the distance determination signal indicates that the distance is equal to or less than such a second distance shorter than the first distance, the transmission controller 13 causes the sound pressure determination unit 11 to start an operation of determining the sound pressure of the voice signal output from the microphone 22.

In the radio communication device according to the first embodiment, when the sound pressure determination signal indicates the sound presence after the operation of generating the transmission voice signal and the operation of determining the sound pressure of the voice signal are started, the transmission controller 13 supplies the transmission control signal to the transmission circuit 15 so that the transmission circuit 15 transmits the transmission voice signal as a radio wave.

Hence, in accordance with the radio communication device according to the first embodiment, it is possible to appropriately determine the state in which the user of the radio communication device intends to transmit a voice, and to switch the radio communication device to the transmission state.

In accordance with the radio communication device according to the first embodiment, when the distance determination signal indicates that the distance is equal to or less than the first distance, the operation of generating the transmission voice signal by the transmission voice processor 14 is started. Therefore, it is possible to greatly reduce a phenomenon that the head of the voice to be transmitted is cut off, that is, a so-called head cutting.

When the distance determination signal indicates that the distance exceeds the first distance, it is preferable that the transmission controller 13 deactivate the transmission voice processor 14. When the distance determination signal indicates that the distance is equal to or less than the first distance, it is preferable that the transmission controller 13 activate the deactivated transmission voice processor 14. In this way, since the transmission voice processor 14 is in non-operation except when necessary, power consumption can be reduced.

When the distance determination signal indicates that the distance exceeds the second distance, it is preferable that the transmission controller 13 deactivate the sound pressure determination unit 11. When the distance determination signal indicates that the distance is equal to or less than the second distance, it is preferable that the transmission controller 13 activate the deactivated sound pressure determination unit 11. In this way, since the sound pressure determination unit 11 is in non-operation except when necessary, power consumption can be reduced.

Second Embodiment

Hereinafter, a description will be made of a radio communication device according to a second embodiment with reference to the accompanying drawings. In FIG. 1, the radio communication device according to the second embodiment includes a main body 10 and a speaker microphone 20 connected to the main body 10. Functions of the speaker microphone 20 may be incorporated in the main body 10. The radio communication device transmits or receives voice data in a half-duplex communication method.

Figure 6A:
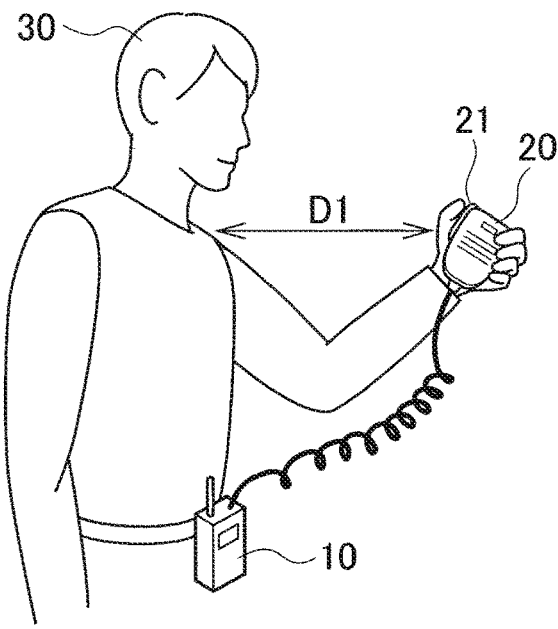
FIG. 6A is a diagram illustrating a state in which the user tries to use the speaker microphone and brings the speaker microphone close to himself/herself.

As shown in FIG. 6A, a user 30 of the radio communication device mounts the main body 10 at any position on his or her body, and grasps the speaker microphone 20 by hand when trying to transmit voice data. When the functions of the speaker microphone 20 are incorporated in the main body 10, the user 30 grips the main body 10 by hand.

Figure 5:
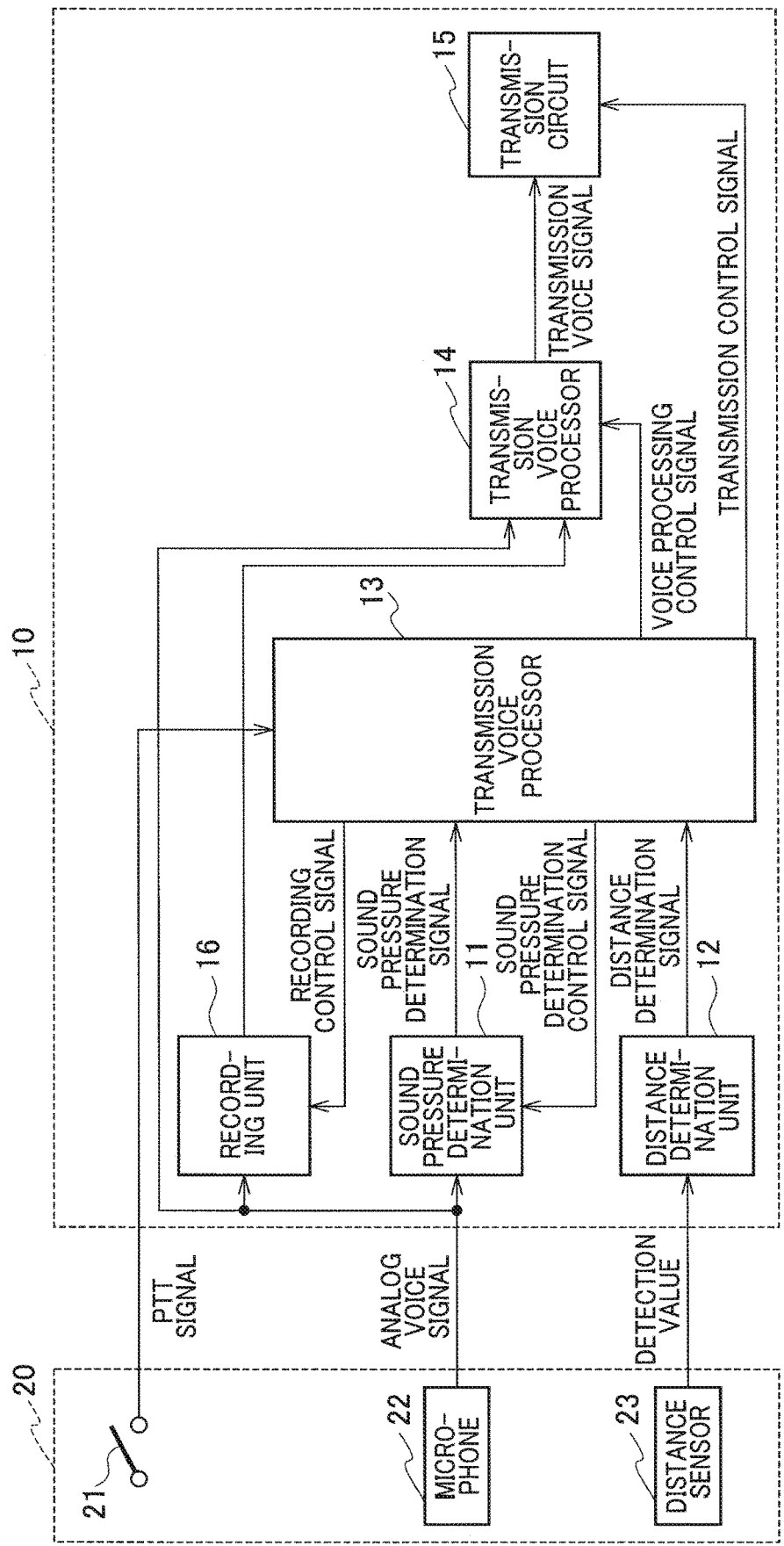
FIG. 5 is a block diagram illustrating a radio communication device according to a second embodiment.

In FIG. 5, the speaker microphone 20 includes a PTT switch 21, a microphone 22, and a distance sensor 23. The speaker microphone 20 includes a speaker (not shown) that generates a voice which is based on voice data received by the main body 10. The main body 10 includes a sound pressure determination unit 11, a distance determination unit 12, a transmission controller 13, a transmission voice processor 14, a transmission circuit 15, and a recording unit 16. The main body 10 also includes a reception circuit (not shown), but only components related to transmission are shown in FIG. 5.

When the user 30 depresses the PTT switch 21 for transmitting voice data, the PTT switch 21 supplies a PTT signal for operating the transmission circuit 15 to the transmission controller 13. When the user 30 emits a voice, the microphone 22 collects the voice and supplies an analog voice signal to the sound pressure determination unit 11, the transmission voice processor 14, and the recording unit 16.

For example, the distance sensor 23 emits a transmission wave which is made of infrared rays to a predetermined object, and supplies a detection value generated based on a phase difference between a transmission wave and a reflected wave which is reflected by the object to the distance determination unit 12. The detection value of the distance sensor 23 is a value corresponding to the distance from the distance sensor 23 to the object. Here, the object is the user 30.

The sound pressure determination unit 11 is provided to realize a so-called VOX function to switch the radio communication device to a transmission state when the microphone 22 collects the voice. The radio communication device provided with the VOX function is capable of hands-free talk. The sound pressure determination unit 11 determines the sound pressure of the analog voice signal input thereto, and generates the sound pressure determination signal.

The sound pressure determination unit 11 generates a signal indicating "sound presence" if the sound pressure is equal to or greater than a predetermined threshold value, and generates a sound pressure determination signal indicating "silence" if the sound pressure is less than the predetermined threshold value. Furthermore, the voice during a conversation is not a continuous sound. Therefore, when the sound pressure reaches the predetermined threshold value or greater, and thereafter, the sound pressure becomes less than the predetermined threshold value, then the sound pressure determination unit 11 maintains a sound pressure determination signal which indicates the sound presence for a predetermined time. The sound pressure determination unit 11 supplies the sound pressure determination signal to the transmission controller 13.

The distance determination unit 12 determines a distance to the user 30 based on the detection value input thereto, and generates a distance determination signal. The distance determination unit 12 supplies the distance determination signal to the transmission controller 13. Based on the input distance determination signal, the transmission controller 13 can determine whether a distance D from the distance sensor 23 (the speaker microphone 20) to the user 30 is equal to or less than a distance D1 shown in FIG. 6A, is equal to or less than a distance D2 shown in FIG. 6B, or is equal to or less than a distance D3 shown in FIG. 6C.

Figure 6B:
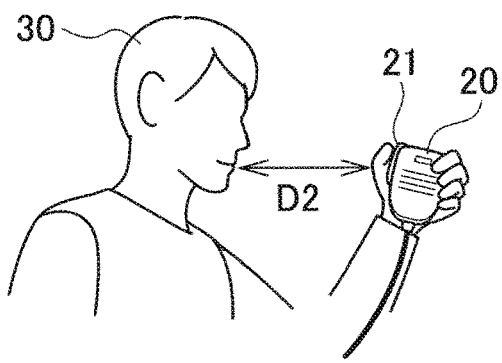
FIG. 6B is a diagram illustrating a state in which the user brings the speaker microphone closer to himself/herself than in FIG. 6A.
Figure 6C:
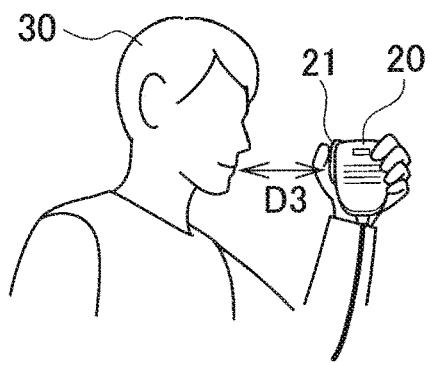
FIG. 6C is a diagram illustrating a state in which the user brings the speaker microphone closer to himself/herself than in FIG. 6B in order to emit a voice.

The distance D1 shown in FIG. 6A is a distance in a state in which the user 30 tries to use the speaker microphone 20 and brings the speaker microphone 20 close to himself/herself. The distance D2 shown in FIG. 6B is a distance in a state in which the user 30 brings the speaker microphone 20 closer to himself/herself than in FIG. 6A. The distance D3 shown in FIG. 6C is a distance in a state in which the user 30 brings the speaker microphone 20 closer to himself/herself than in FIG. 6B in order to emit a voice.

The recording unit 16 includes an A/D converter and a memory which is a RAM, for example. The recording unit 16 records a digital voice signal which is obtained by A/D converting an analog voice signal input thereto for a predetermined time. The recording unit 16 overwrites and updates the digital voice signal to be recorded with FIFO (First-In First-Out). The recording unit 16 only needs to record the digital voice signal for about 1 second.

As will be described later, the sound pressure determination unit 11 and the recording unit 16 are not always operating, and are configured to operate when conditions to be described later are satisfied.

The transmission controller 13 controls the sound pressure determination unit 11, the transmission voice processor 14, the transmission circuit 15, and the recording unit 16. The transmission controller 13 can be composed of a CPU of a microcomputer. The transmission controller 13 and the transmission voice processor 14 may be composed of a microcomputer, or may be composed of a DSP (Digital Signal Processor).

To the sound pressure determination unit 11, the transmission controller 13 supplies a sound pressure determination control signal for switching the sound pressure determination unit 11 between an operation and a non-operation. To the recording unit 16, the transmission controller 13 supplies a recording control signal for switching the recording unit 16 between an operation and a non-operation.

Such an analog voice signal output from the microphone 22 is input to the transmission voice processor 14. When the recording unit 16 is operating, the analog voice signal output from the microphone 22 and the digital voice signal read out from the recording unit 16 are input to the transmission voice processor 14. The transmission voice processor 14 includes: an amplifier that amplifies the analog voice signal; an A/D converter that converts the analog voice signal into a digital voice signal; a filter that filters the digital voice signal; a vocoder that encodes the filtered digital voice signal; and the like.

In order to transmit a voice signal by the transmission circuit 15, the transmission voice processor 14 implements voice processing for the signal input thereto, and generates such a transmission voice signal. First, the transmission voice processor 14 implements the voice processing for the digital voice signal readout from the recording unit 16. Subsequently, the transmission voice processor 14 implements the voice processing for the analog voice signal output from the microphone 22, and generate the transmission voice signal.

The recording unit 16 starts to reproduce such a recording therein when the recording unit 16 is set to a transmission state to be described later. The recording unit 16 performs such reproduction while performing the recording by using the following existing technology, thereby reducing the time while the data is recorded. In the technology, the recording unit 16 increases the data of the digital voice signal to be reproduced more than the data of the digital voice signal to be recorded, thereby accelerating the speech speed of the read digital voice signal or shortening a silent portion. The transmission voice processor 14 switches to the analog signal output from the microphone 22 when a recorded signal disappears and data to be read out disappears. That is, the transmission voice processor 14 implements the voice processing for the digital voice signal read out from the recording unit 16. Subsequently, the transmission voice processor 14 implements the voice processing for the analog voice signal output from the microphone 22.

The transmission voice processor 14 also does not always operate, and is configured to operate when conditions to be described later are satisfied. To the transmission voice processor 14, the transmission controller 13 supplies a voice processing control signal for switching the transmission voice processor 14 between an operation and a non-operation. When the transmission voice processor 14 is in operation, the transmission voice processor 14 supplies the transmission voice signal to the transmission circuit 15.

The transmission circuit 15 includes a PLL circuit for oscillating at a predetermined oscillation frequency, a power amplifier, and the like. When a transmission control signal is supplied from the transmission controller 13, the transmission circuit 15 modulates the input transmission voice signal by an oscillation frequency at which the PLL circuit oscillates, and then transmits the modulated transmission voice signal as a radio wave.

Figure 7A:
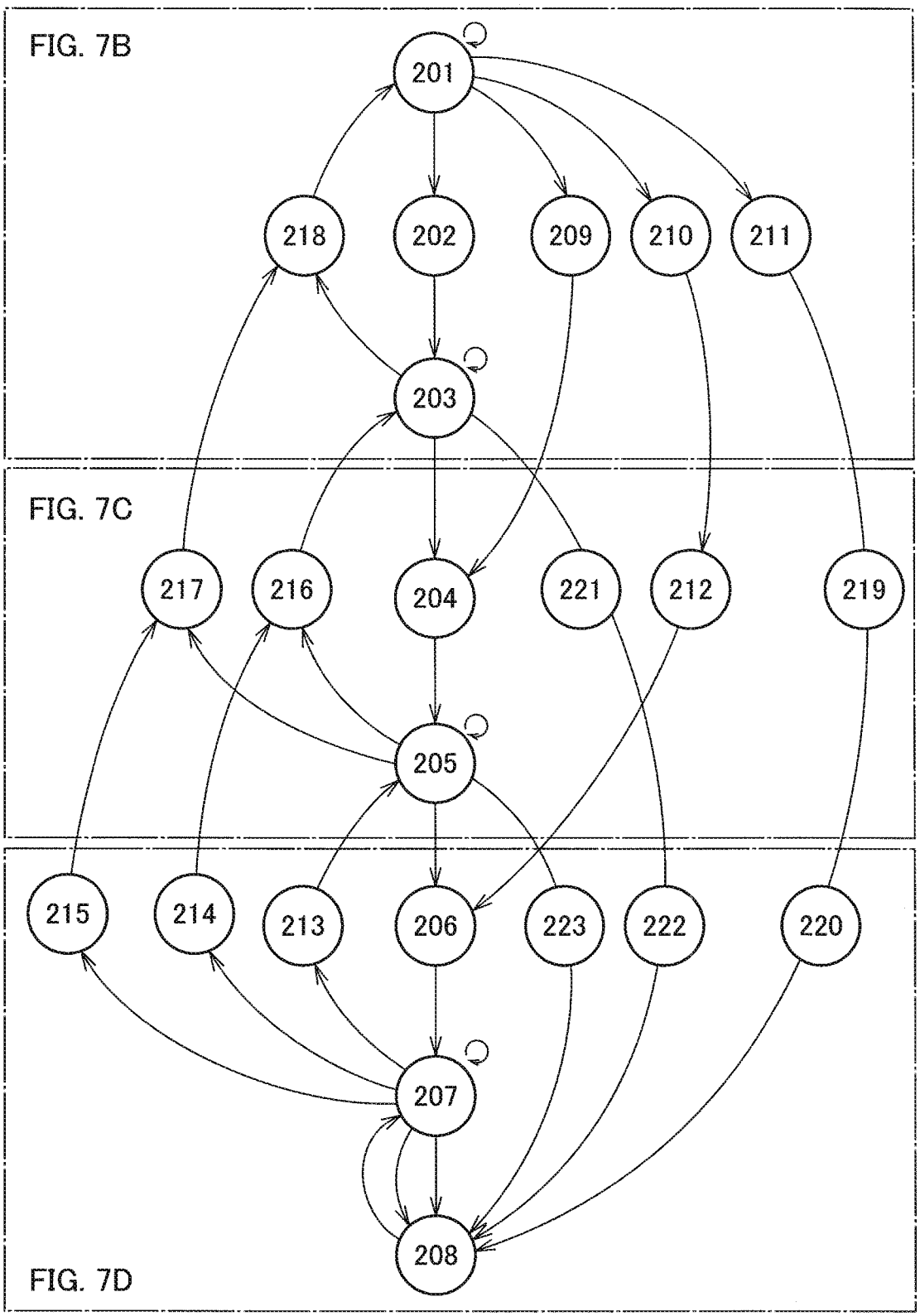
FIG. 7A is an entire state transition diagram illustrating operations of the radio communication device according to the second embodiment.

Next, with reference to state transition diagrams shown in FIGS. 7A to 7D, a description will be made of how the transmission controller 13 controls the respective units. FIG. 7A shows an entire operation of the radio communication device of the second embodiment. Details of states 201 to 203, 209 to 211, and 218 in FIG. 7A are shown in FIG. 7B. Details of states 204, 205, 212, 216, and 217 of FIG. 7A are shown in FIG. 7O. Details of states 206 to 208 and 213 to 215 in FIG. 7A are shown in FIG. 7D.

In FIG. 7B, the transmission controller 13 waits for an interruption of the distance determination signal so as to monitor a value of the distance determination signal in state 201, which is a standby state in which the reception or the transmission is not performed. In state 201, it is assumed that the position of the speaker microphone 20 is farther than the position of the distance D1 shown in FIG. 6A.

When the user 30 brings the speaker microphone 20 close to himself/herself, the distance D becomes equal to or less than the distance D1, and such a distance determination signal indicating that the distance D is equal to or less than the distance D1 interrupts the transmission controller 13, then the transmission controller 13 makes a transition to state 202. In state 202, the transmission controller 13 actuates the transmission voice processor 14 in non-operation, activates the transmission voice processor 14, and makes a transition to state 203.

In state 203, the transmission controller 13 further waits for an interruption of the distance determination signal. When the user 30 brings the speaker microphone 20 still closer to himself/herself, the distance D becomes equal to or less than the distance D2, and such a distance determination signal indicating that the distance D is equal to or less than the distance D2 interrupts the transmission controller 13, then the transmission controller 13 makes a transition to state 204 as shown in FIG. 7G.

In state 204, the transmission controller 13 actuates the recording unit 16 in non-operation, activates the recording unit 16, and makes a transition to state 205. By activating the recording unit 16, the recording unit 16 starts to update, record, and read the digital voice signal.

In state 205, the transmission controller 13 further waits for an interruption of the distance determination signal. When the user 30 brings the speaker microphone 20 still closer to himself/herself, the distance D becomes equal to or less than the distance D3, and such a distance determination signal indicating that the distance D is equal to or less than the distance D3 interrupts the transmission controller 13, then the transmission controller 13 makes a transition to state 206 as shown in FIG. 7D.

In state 206, the transmission controller 13 actuates the sound pressure determination unit 11 in non-operation, activates the sound pressure determination unit 11, and makes a transition to state 207. In state 207, the transmission controller 13 waits for input of the sound pressure determination signal so as to monitor the value of the sound pressure determination signal.

When such a sound pressure determination signal indicating that the sound pressure becomes equal to or greater than the threshold value is input to the transmission controller 13, then in state 208, the transmission controller 13 supplies the transmission control signal to the transmission circuit 15, actuates the transmission circuit 15, and controls the transmission circuit 15 to transmit the transmission control signal output from the transmission controller 13.

Returning to FIG. 7B in state 201, when the user 30 rapidly brings the speaker microphone 20 close to himself/herself, the distance D may sometimes become instantaneously equal to or less than the distance D2. In state 201, when such a distance determination signal indicating that the distance D has become equal to or less than the distance D2 interrupts the transmission controller 13, the transmission controller 13 makes a transition to state 209. In state 209, the transmission controller 13 actuates the transmission voice processor 14 in non-operation, activates the transmission voice processor 14, and makes a transition to state 204.

Moreover, in state 201, when the user 30 rapidly brings the speaker microphone 20 close to himself/herself, the distance D may also sometimes become instantaneously equal to or less than the distance D3. In state 201, when such a distance determination signal indicating that the distance D has become equal to or less than the distance D3 interrupts the transmission controller 13, the transmission controller 13 makes a transition to state 210. In state 210, the transmission controller 13 actuates the transmission voice processor 14 in non-operation, activates the transmission voice processor 14, and makes a transition to state 212 as shown in FIG. 7C.

In state 212, the transmission controller 13 actuates the sound pressure determination unit 11 in non-operation, activates the sound pressure determination unit 11, and makes a transition to state 206 shown in FIG. 7D.

Figure 7C:
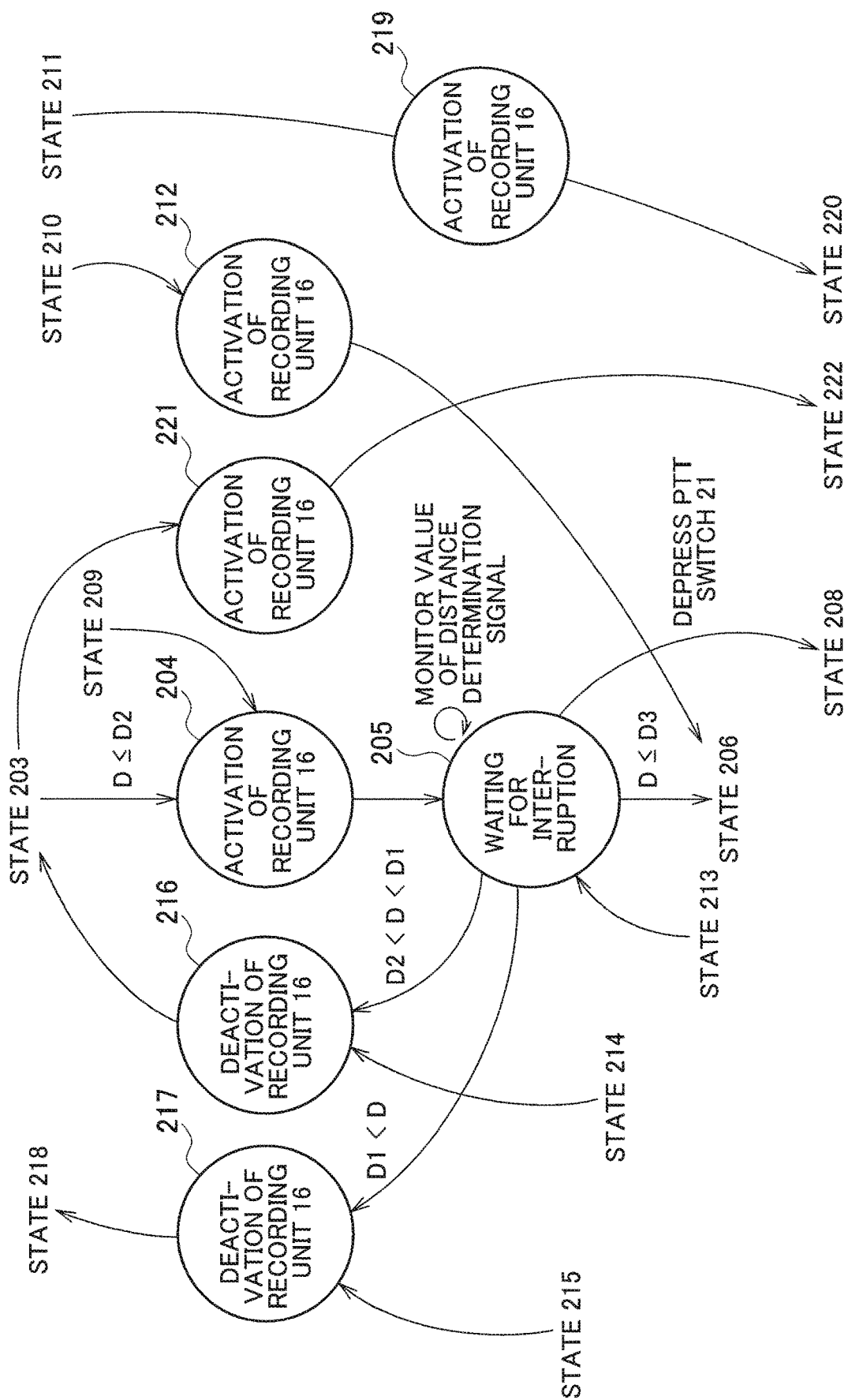
FIG. 7C is a partial state transition diagram illustrating the operations of the radio communication device according to the second embodiment, the partial state transition diagram following FIG. 7B.
Figure 7D:
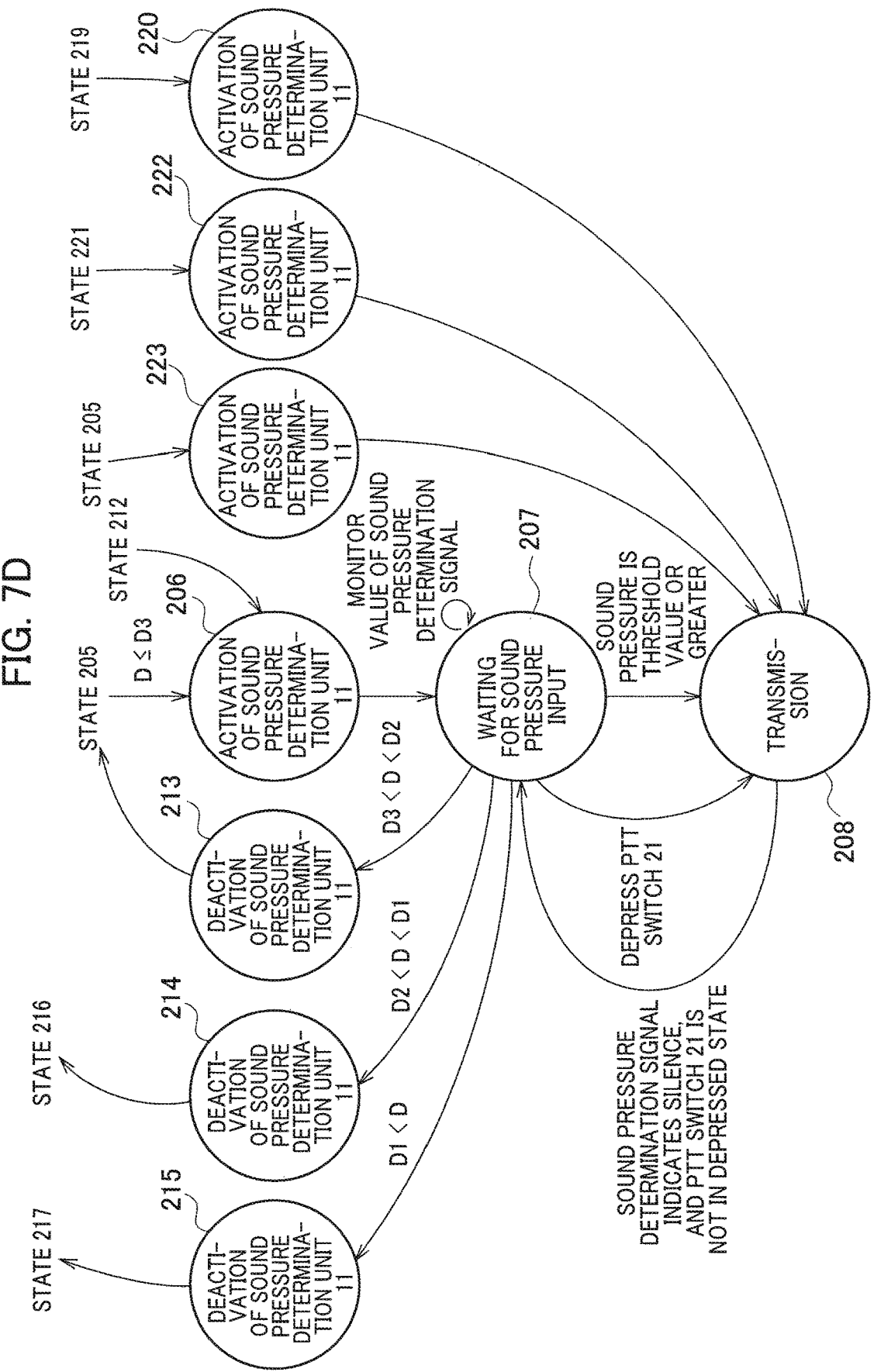
FIG. 7D is a partial state transition diagram illustrating the operations of the radio communication device according to the second embodiment, the partial state transition diagram following FIG. 7C.

In state 201 shown in FIG. 7B, when the user 30 depresses the PTT switch 21, then in response to the input of the PTT signal, the transmission controller 13 activates the transmission voice processor 14 in state 211, and activates the recording unit 16 in state 219 as shown in FIG. 7C. Furthermore, the transmission controller 13 activates the sound pressure determination unit 11 in state 220 as shown in FIG. 7D, and makes a transition to state 208. In state 208, the transmission controller 13 supplies the transmission control signal to the transmission circuit 15, actuates the transmission circuit 15, and controls the transmission circuit 15 to transmit the transmission control signal output from the transmission controller 13.

In state 203 shown in FIG. 7B, when the user 30 depresses the PIT switch 21, then in response to the input of the PIT signal, the transmission controller 13 activates the recording unit 16 in state 221 as shown in FIG. 7C, activates the sound pressure determination unit 11 in state 222 as shown in FIG. 7D, and makes a transition to state 208. In state 208, the transmission controller 13 actuates the transmission circuit 15, and controls the transmission circuit 15 to transmit the transmission control signal output from the transmission controller 13.

In state 205 shown in FIG. 7C, when the user 30 depresses the PIT switch 21, then in response to the input of the PTT signal, the transmission controller 13 activates the sound pressure determination unit 11 in state 223 as shown in FIG. 7D, and makes a transition to state 208. In state 208, the transmission controller 13 actuates the transmission circuit 15, and controls the transmission circuit 15 to transmit the transmission control signal output from the transmission controller 13.

In state 207 shown in FIG. 7D, also when the user 30 depresses the PTT switch 21, the transmission controller 13 makes a transition to state 208, actuates the transmission circuit 15, and controls the transmission circuit 15 to transmit the transmission control signal output from the transmission controller 13.

In state 208, when the sound pressure determination signal indicates the silence, and the PTT switch 21 is not in a depressed state, then the transmission controller 13 makes a transition to state 207.

Instate 207 as shown in FIG. 7D, if the distance D exceeds the distance D3 and becomes less than the distance D2 before the sound pressure becomes equal to or greater than the threshold value or before the PTT switch 21 is depressed, then the transmission controller 13 makes a transition to state 213, deactivates the transmission voice processor 14, and makes a transition to state 205 shown in FIG. 70.

Moreover, in state 207, if the distance D exceeds the distance D2 and becomes less than the distance D1 before the sound pressure becomes equal to or greater than the threshold value or before the PTT switch 21 is depressed, then the transmission controller 13 makes a transition to state 214, and deactivates the transmission voice processor 14. Furthermore, the transmission controller 13 makes a transition to state 216 shown in FIG. 70, deactivates the recording unit 16, and makes a transition to state 203.

Further, in state 207, if the distance D exceeds the distance D1 before the sound pressure becomes equal to or greater than the threshold value or before the PTT switch 21 is depressed, then the transmission controller 13 makes a transition to state 215, deactivates the transmission voice processor 14, makes a transition to state 217 as shown in FIG. 7C, and deactivates the recording unit 16. Furthermore, the transmission controller 13 makes a transition to state 218 shown in FIG. 7B, deactivates the transmission voice processor 14, and makes a transition to state 201.

In state 205 shown in FIG. 7C, if the distance D exceeds the distance D2 and becomes less than the distance D1 before the distance D becomes equal to or less than the distance D3, then the transmission controller 13 makes a transition to state 216, deactivates the recording unit 16, and makes a transition to state 203 as shown in FIG. 7B. Moreover, if the distance D exceeds the distance D1 before the distance D becomes equal to or less than the distance D3, then the transmission controller 13 makes a transition to state 217, deactivates the recording unit 16, and makes a transition to state 218 shown in FIG. 7B.

In state 203 shown in FIG. 7B, if the distance D exceeds the distance D1 before the distance D becomes equal to or less than the distance D2, then the transmission controller 13 makes a transition to state 218, deactivates the transmission voice processor 14, and makes a transition to state 201.

Figure 8:
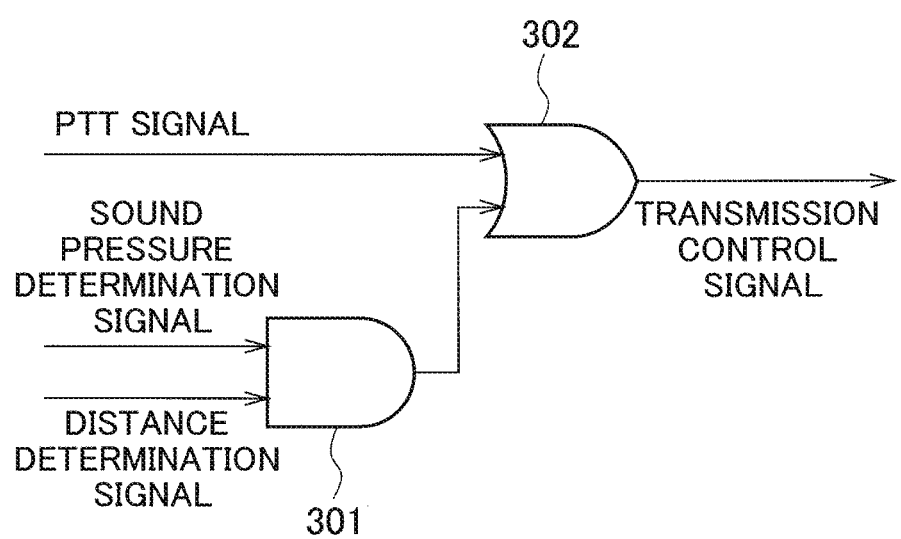
FIG. 8 is a conceptual diagram logically illustrating conditions under which a transmission controller in the radio communication device according to the second embodiment operates a transmission circuit.

FIG. 8 is a logical conceptual diagram showing conditions under which the transmission controller 13 supplies the transmission control signal to the transmission circuit 15 to operate the transmission circuit 15. The sound pressure determination signal and the distance determination signal are input to an AND circuit 301. A high-output signal is input to an OR circuit 302 under conditions that the sound pressure determination signal indicates sound presence and that the distance D is equal to or less than the distance D3, the conditions being determined by the sound pressure determination signal and the distance determination signal.

The PTT signal and the output signal of the AND circuit 301 are input to the OR circuit 302. The OR circuit 302 supplies the transmission control signal to the transmission circuit 15, when the PTT signal is input to the OR circuit 202, or the high-output signal is input thereto.

As described above, in the radio communication device according to the second embodiment, when the distance determination signal indicates that the distance is equal to or less than such a first distance, the transmission controller causes the transmission voice processor 14 to start operations of implementing the voice processing for the voice signal output from the microphone 22, and for generating the transmission voice signal.

When the distance determination signal indicates that the distance is equal to or less than the second distance shorter than the first distance, the radio communication device according to the second embodiment causes the recording unit 16 to start update recording and reading the voice signal. When the recording unit 16 starts the operations, the transmission voice processor 14 implements the voice processing for the digital voice signal read out from the recording unit 16 and the analog voice signal output from the microphone 22, and generates the transmission voice signal.

In the radio communication device according to the second embodiment, when the distance determination signal indicates that the distance is equal to or less than such a third distance shorter than the second distance, the transmission controller 13 causes the sound pressure determination unit 11 to start the processing for determining the sound pressure of the voice signal output from the microphone 22.

In the radio communication device according to the second embodiment, when the sound pressure determination signal indicates the sound presence after the operation of generating the transmission voice signal, the operation of update recording and reading the voice signal, and the operation of determining the sound pressure of the voice signal has started, the transmission controller 13 supplies the transmission control signal to the transmission circuit 15 so that the transmission circuit 15 transmits the transmission voice signal as a radio wave.

Hence, in accordance with the radio communication device according to the second embodiment, it is possible to appropriately determine the state in which the user of the radio communication device intends to transmit a voice, and to switch the radio communication device to the transmission state.

In accordance with the radio communication device according to the second embodiment, when the distance determination signal indicates that the distance is equal to or less than the first distance, the operation of generating the transmission voice signal by the transmission voice processor 14 is started. Therefore, it is possible to reduce a phenomenon that a head of the voice to be transmitted is cut off, that is, a so-called head cutting.

In addition to this, the radio communication device according to the second embodiment includes the recording unit 16. When the distance determination signal indicates that the distance is equal to or less than the second distance, the radio communication device records the voice signal before the sound pressure determination signal indicates that the sound pressure is equal to or greater than the predetermined threshold value. The transmission circuit 15 transmits the voice output from the microphone 22 subsequent to the voice which is recorded in the recording unit 16 and has not reached the predetermined threshold value. Hence, in accordance with the radio communication device according to the second embodiment, it is possible to substantially eliminate the head cutting.

When the distance determination signal indicates that the distance exceeds the first distance, it is preferable that the transmission controller 13 deactivate the transmission voice processor 14. When the distance determination signal indicates that the distance is equal to or less than the first distance, it is preferable that the transmission controller 13 activate the deactivated transmission voice processor 14. In this way, since the transmission voice processor 14 is in non-operation except when necessary, power consumption can be reduced.

When the distance determination signal indicates that the distance exceeds the second distance, it is preferable that the transmission controller 13 deactivate the recording unit 16. When the distance determination signal indicates that the distance is equal to or less than the second distance, it is preferable that the transmission controller 13 activate the deactivated recording unit 16. In this way, since the recording unit 16 is in non-operation except when necessary, power consumption can be reduced.

When the distance determination signal indicates that the distance exceeds the third distance, it is preferable that the transmission controller 13 deactivate the sound pressure determination unit 11. When the distance determination signal indicates that the distance is equal to or less than the third distance, it is preferable that the transmission controller 13 activate the deactivated sound pressure determination unit 11. In this way, since the sound pressure determination unit 11 is in non-operation except when necessary, power consumption can be reduced.

The present invention is not limited to the configuration of the above-described first and second embodiments, and various modifications can be made without departing from the scope of the invention.

What is claimed is:

1. A radio communication device comprising:
   a sound pressure determination unit configured to determine a sound pressure of a voice signal output from, a microphone, and to generate a sound pressure determination signal;
   a distance determination unit configured to determine a distance from, the radio communication device to a user of the radio communication device based on a detection value that is generated by a distance sensor and corresponds to the distance from the radio communication device to the user, and to generate a distance determination signal;
   a transmission voice processor configured to implement voice processing for the voice signal output from the microphone, and to generate a transmission voice signal;
   a transmission circuit configured to transmit the transmission voice signal as a radio wave; and a transmission controller configured to monitor the sound pressure determination signal and the distance determination signal, wherein the transmission controller:

controls the transmission voice processor to start operations of implementing the voice processing for the voice signal output from the microphone and for generating the transmission voice signal, when the distance determination signal indicates that the distance is equal to or less than a first distance;

controls the sound pressure determination unit to start an operation of determining the sound pressure of the voice signal output from the microphone, when the distance determination signal indicates that the distance is equal to or less than a second distance shorter than the first distance; and supplies a transmission control signal to the transmission circuit so that the transmission circuit transmits the transmission voice signal as a radio wave, when the sound pressure determination signal indicates that the sound pressure is equal to or greater than a predetermined threshold value.

2. The radio communication device according to claim 1, wherein the transmission controller:

deactivates the transmission voice processor when the distance determination signal indicates that the distance exceeds the first distance; and activates the deactivated transmission voice processor when the distance determination signal indicates that the distance is equal to or less than the first distance.

3. The radio communication device according to claim 2, wherein the transmission controller:

deactivates the sound pressure determination unit when the distance determination signal indicates that the distance exceeds the second distance; and activates the deactivated sound pressure determination unit when the distance determination signal indicates that the distance is equal to or less than the second distance.

4. The radio communication device according to claim 1, wherein the sound pressure determination unit:

generates a signal indicating sound presence if the voice signal has a sound pressure equal to or greater than a predetermined threshold value, and generates a sound pressure determination signal indicating silence if the voice signal has a sound pressure less than the predetermined threshold value; and maintains the sound pressure determination signal indicating the sound presence for a predetermined time when the sound pressure of the voice signal becomes less than the predetermined threshold value after reaching the predetermined threshold value or greater.

5. A radio communication device comprising:

a sound pressure determination unit configured to determine a sound pressure of a voice signal output from a microphone, and to generate a sound pressure determination signal;

a distance determination unit configured to determine a distance from the radio communication device to a user of the radio communication device based on a detection value that is generated by a distance sensor and corresponds to the distance from the radio communication device to the user, and to generate a distance determination signal;

a recording unit configured to update and record the voice signal output from the microphone for a predetermined time;

a transmission voice processor configured to implement voice processing for the voice signal output from the microphone subsequently to a voice signal read from the recording unit, and to generate a transmission voice signal;

a transmission circuit configured to transmit the transmission voice signal as a radio wave; and a transmission controller configured to monitor the sound pressure determination signal and the distance determination signal, wherein the transmission controller:

controls the transmission voice processor to start to operate when the distance determination signal indicates that the distance is equal to or less than a first distance;

controls the recording unit to start operations of update recording and reading the voice signal, when the distance determination signal indicates that the distance is equal to or less than a second distance shorter than the first distance;

controls the sound pressure determination unit to start an operation of determining the sound pressure of the voice signal output from the microphone, when the distance determination signal indicates that the distance is equal to or less than a third distance shorter than the second distance, and supplies a transmission control signal to the transmission circuit so that the transmission circuit transmits, as a radio wave, a transmission voice signal, generated by the transmission voice processor, including the voice signal read from the recording unit and the voice signal output from the microphone, when the sound pressure determination signal indicates that the sound pressure is equal to or greater than a predetermined threshold value.

6. The radio communication device according to claim 5, wherein the transmission controller:

deactivates the transmission voice processor when the distance determination signal indicates that the distance exceeds the first distance; and activates the deactivated transmission voice processor when the distance determination signal indicates that the distance is equal to or less than the first distance.

7. The radio communication device according to claim 6, wherein the transmission controller:

deactivates the recording unit when the distance determination signal indicates that the distance exceeds the second distance; and activates the recording unit when the distance determination signal indicates that the distance is equal to or less than the second distance.

8. The radio communication device according to claim 7, wherein the transmission controller:

deactivates the sound pressure determination unit when the distance determination signal indicates that the distance exceeds the third distance; and activates the deactivated sound pressure determination unit when the distance determination signal indicates that the distance is equal to or less than the third distance.

9. The radio communication device according to claim 5, wherein
   the sound pressure determination unit:
   generates a signal indicating sound presence if the voice signal has a sound pressure equal to or greater than a predetermined threshold value, and generates a sound pressure determination signal indicating silence if the voice signal has a sound pressure less than the predetermined threshold value; and
   maintains the sound pressure determination signal indicating the sound presence for a predetermined time when the sound pressure of the voice signal becomes less than the predetermined threshold value after reaching the predetermined threshold value or more.

* * * * *

UNITED STATES PATENT AND TRADEMARK OFFICE
CERTIFICATE OF CORRECTION

PATENT NO. : 10,553,237 B2
APPLICATION NO. : 15/890395
DATED : February 4, 2020
INVENTOR(S) : Manabu Nakano Page 1 of 1

It is certified that error appears in the above-identified patent and that said Letters Patent is hereby corrected as shown below:

In the Claims

Claim 1, Column 14, Line 56, delete the "," between "distance from" and "the radio".

Signed and Sealed this
Seventh Day of April, 2020

Andrei Iancu
*Director of the United States Patent and Trademark Office*